Sept. 9, 1952
A. CLARK
2,610,200
SYNTHESIS OF HYDROCARBONS
Filed May 15, 1946
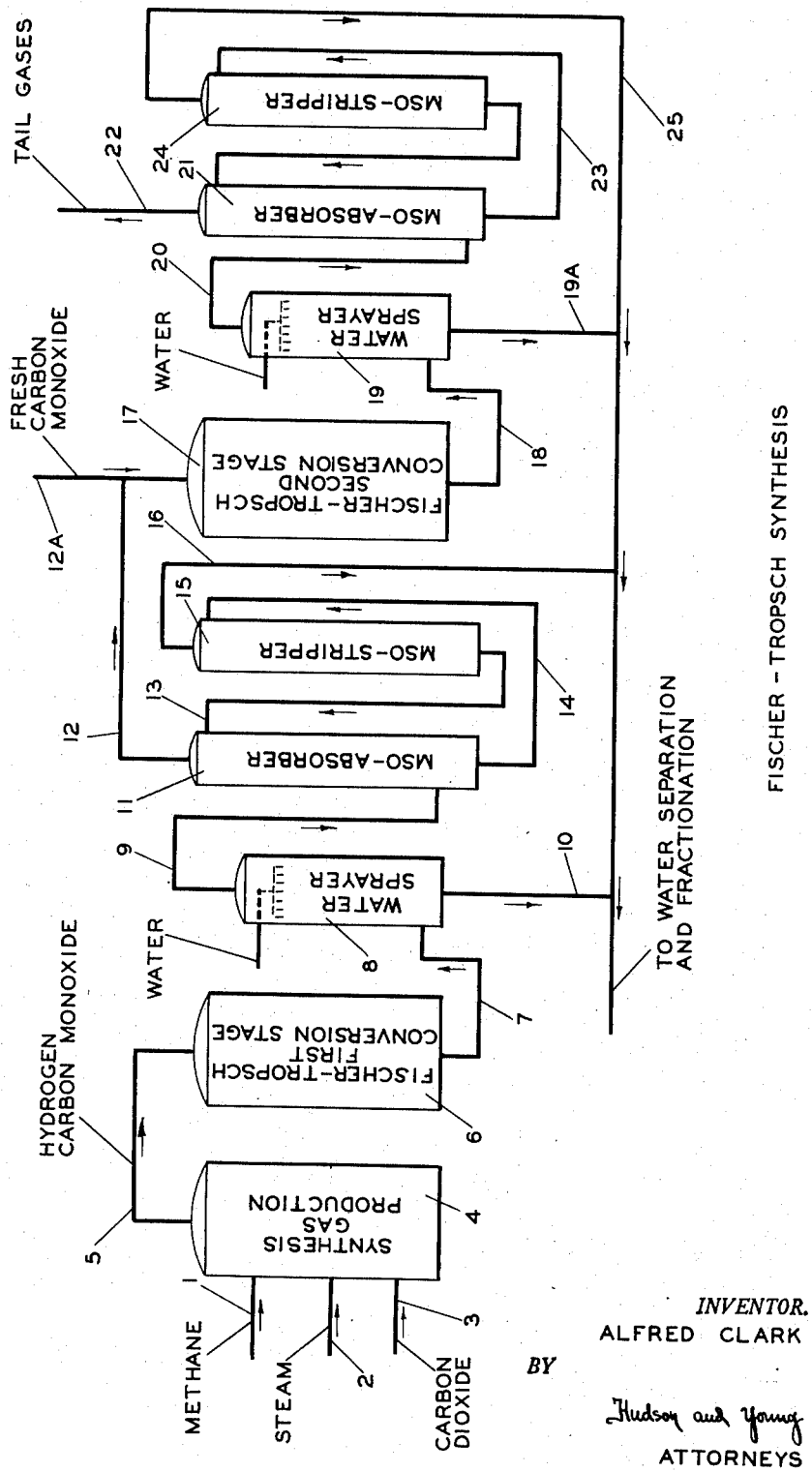
INVENTOR.
ALFRED CLARK
BY Hudson and Young
ATTORNEYS Patented Sept. 9, 1952

2,610,200

UNITED STATES PATENT OFFICE 2,610,200

SYNTHESIS OF HYDROCARBONS

Alfred Clark, Bartlesville, Okla., assignor to Phillips Petroleum Company, a corporation of Delaware Application May 15, 1946, Serial No. 669,792

4 Claims. (Cl. 260—449.6)

This invention relates to the synthesis of hydrocarbons by the reduction of carbon oxides with hydrogen. More particularly it relates to the synthesis of hydrocarbons by the reaction of carbon monoxide and hydrogen in the presence of a catalyst under suitable conditions of temperature and pressure.

The reaction for the synthesis of hydrocarbons, and particularly gasoline range and higher boiling hydrocarbons, is carried out by contacting a suitable catalyst for the conversion with a gas mixture consisting of or largely comprising carbon monoxide and hydrogen in desired proportions, and under certain specific temperature and pressure conditions. In general, using cobalt catalysts or those containing substantial portions thereof, reaction temperatures in the range of 175–225° C. may be used with the optimum temperature being in the neighborhood of 185°–190° C. Ordinary iron catalysts operate best in a narrow range close to 240° C. while sintered iron catalysts require temperatures in the neighborhood of 320° C.

The synthesis reaction is usually carried out at atmospheric or medium pressures, depending on the composition of product desired and the catalyst used. A preferred range of pressures suitable for general use is from 5 to 15 atmospheres, but solid and liquid hydrocarbons may be produced in good yields at pressures of atmospheric to 150 atmospheres or higher.

Flow rates are variable, depending also on catalyst, cooling means used and products desired. Increasing contact time results in a lower catalyst operating temperature and higher yields per pass with less formation of methane. In order to obtain a satisfactory rate of production, suitably rapid flow rates must be provided. With cobalt catalysts, for example, space velocities of about 95–115 cubic feet of synthesis gas per hour per cubic foot of catalyst are usually preferred. A space velocity of 113 cubic feet gives a conversion of about 70 per cent per pass at 185° C. With sintered iron catalysts, much higher space velocities may be used, and velocities of 10,000–30,000 cubic feet of synthesis gas per hour per cubic foot of catalyst have given satisfactory results.

Since the reaction is highly exothermic, cooling means must ordinarily be provided. Such means include cooling tubes through which water or other cooling fluid is circulated such tubes being positioned in or surrounding the catalyst zone. The use of direct heat exchange with non-reactive liquids directly introduced into the reaction zone has also been suggested.

In addition to the catalysts referred to herein, other desirable catalysts include nickel-manganese-alumina on kieselguhr, nickel-thoria on kieselguhr, and cobalt-thoria-copper on kieselguhr.

An object of this invention is to provide a process for the hydrogenation of carbon monoxide wherein the yield per hour per volume of catalyst in the second stage of a two-stage catalytic process is improved so that it is substantially equal to that obtained in the first stage of operation.

Another object of this invention is to improve yields of liquid hydrocarbons per hour per volume of catalyst in a single stage operation in which the original feed gases contain substantial quantities of inerts such as methane and carbon dioxide and less than the optimum percentage of carbon monoxide.

In the process of converting mixtures of hydrogen and carbon monoxide into liquid and solid hydrocarbon products, it is often feasible to run the process in two stages in order to obtain the maximum conversion of the initial gas mixture of liquid and solid products. When operating two conversion stages, it is desirable to operate in the neighborhood of 70 per cent conversion per stage, thus making an overall conversion of roughly 91 per cent based on the carbon monoxide entering the first stage. The residual gas from the first stage of operation, i. e., the effluent after removal of $C_3$'s and heavier becomes the feed for the second stage of operation. The composition of this first stage residue gas or second stage feed gas will vary somewhat depending upon the temperature level of operation in the first stage. Due to the unavoidable formation of a certain quantity of inerts such as methane, ethane and carbon dioxide, however, the percentage of carbon monoxide in this gas will most frequently be less than in the initial synthesis gas. It has been observed experimentally, that the yield of valuable hydrocarbons per unit volume of catalyst per hour under such conditions is lower for the second stage of operation than for the first under the same operating conditions for both stages. Since the yield per unit volume of catalyst is inversely proportional to the size of the plant required for a given production, it is very important that this yield be maintained at a maximum for both stages. It has further been observed experimentally, that the percentage decrease in yield per unit volume of catalyst obtained in the second stage is directly proportional to the percentage decrease in carbon monoxide content in the feed gas to the second stage over that to the first stage. By adding carbon monoxide to the second stage feed gases until the percentage is equal to that in the first stage feed gases, it has been found that second stage yields per unit volume of catalyst are improved so that they are equal to first stage yields. In spite of the fact, that upon addition of carbon monoxide from some external source to the second stage feed gases the ratio of hydrogen to carbon monoxide is less than in the initial synthesis gas, this fact apparently has no substantial influence on the improvement of yields by the method of this invention as long as the conversion of carbon monoxide is maintained at substantially no greater than 70 per cent. Substantially higher conversions, it has been found, require a greater initial amount of hydrogen. The fact that increasing the carbon monoxide content of second stage feed gas to equal that initially in first stage feed gas improves yields cannot be predicted from prior art. From prior art, it is evident that the effect of dilution on yields is dependent on the particular diluent or combination of diluents as well as on the quantity of diluent. In the present invention it has been shown that diluents from first stage reaction, such as methane, ethane and carbon dioxide, have no deleterious effect on yields per unit volume of catalyst as long as the carbon monoxide content is maintained at the initial level.

The initial optimum concentration of carbon monoxide in synthesis gas for this process, when no inerts are present, varies with the nature of the catalyst. For cobalt type catalysts, it is appropriate to use an initial feed containing two parts of hydrogen to one part of carbon monoxide by volume. In general the composition of the synthesis gas may vary from 1 to 3 parts of hydrogen for each part of CO depending on the catalyst used and other factors.

Carbon monoxide for injection into the second stage feed gas may be obtained by high temperature interaction of carbon dioxide with carbon or carbonaceous material; it may be absorbed in recoverable form from CO-containing gases by absorbents known to the art, such as cuprous ammonium formate or cuprous ammonium lactate solutions; or CO-rich gases may be blended directly with first stage residue gas.

The present invention may also be used in connection with one stage of operation. For instance, in most industrial preparations of synthesis gas a certain quantity of inert gases, such as nitrogen, methane, ethane and carbon dioxide, will be present. If the carbon monoxide content is increased so that the feed gas contains the percentage that would be present on an inert-free basis, yields per unit volume of catalyst will then be equal to those obtained with inert-free gas containing the same concentration of carbon monoxide, providing the conversion of carbon monoxide is substantially no greater than 70 per cent.

In the accompanying drawing, a flow diagram illustrates the process of this invention when two stages of conversion are employed. The synthesis gas feed is produced by introducing methane, steam and $CO_2$ via lines 1, 2 and 3, respectively, into gas producing zone 4, where partial combustion of methane takes place with formation of $H_2$ and CO in the desired proportions. The synthesis gas is introduced via line 5 into a first conversion stage 6, containing the desired synthesis catalyst, and conditions are so regulated that not more than about 70 per cent conversion of CO takes place. From the conversion unit the total effluent flows through line 7 to a cooler 8, where a water spray is utilized to condense heavy hydrocarbons and waxes. These, and condensed water, are removed via line 10, and flow to water separation and fractionation means not shown. The uncondensed effluent passes through line 9 to absorber 11, where $C_3$ and heavier hydrocarbons are absorbed in mineral seal oil or other absorbent. Unabsorbed gases which include methane, ethane and unreacted synthesis gas, are removed overhead via line 12 and flow to the second stage conversion zone 17. The mineral seal oil solution flows to stripper 15 via line 14 where dissolved hydrocarbons are stripped overhead by heating or by decreasing pressure, the stripped absorbent being returned to the absorber via line 13. The stripped hydrocarbons flow to the fractionation means through line 16. Fresh CO to bring the CO concentration up to the desired level, or to that existing in the feed to the first conversion stage, is introduced through line 12a and the residual gas plus added CO flows to the second synthesis stage 17 where conversion is carried out under the desired conditions. The products flow to cooling unit 19 where heavier hydrocarbons and waxes are condensed by means of a water spray, and water and hydrocarbons etc. are removed through line 19a. The uncondensed product goes to absorber 21 via line 20, where mineral seal oil or other suitable absorbent dissolves $C_3$ and higher hydrocarbons, the residue and unreacted gas going overhead through line 22 as tail gas. The solution flows into stripper 24 via line 23, and the light hydrocarbons are stripped out by heating or pressure reduction. These go to fractionation through line 25, while the stripped absorbent is returned to absorber 21.

*Example I*

Normal two-stage operation was carried out under the following conditions:

|  | 1st Stage | 2nd Stage | Overall |
|---|---|---|---|
| Catalyst | Co: ThO2 | Co: ThO2 |  |
| Temperature, °C | 220 | 220 |  |
| Space velocity (v./v. cat./hr.) | 153 | 153 | 118 |
| Pressure, p. s. i. g | 100 | 100 |  |
| Percent Contraction | 71 | 51 | 85.8 |
| Percent Conversion | 76 | 65 | 91.6 |

The yield of hydrocarbons ($C_3+$) in the first stage was 17.0 gms. per liter of catalyst per hour, and in the second stage was 14.7 gms. per liter of catalyst per hours. The composition of the feed gas for the second stage (tail gas from 1st stage) was:

|  | Per cent |
|---|---|
| CO | 28.9 |
| $H_2$ | 48.2 |
| $CH_4$ | 18.5 |
| $CO_2$ | 3.8 |
|  | 99.4 |

The first stage feed gas contained 33.3 per cent CO and 66.6 per cent $H_2$.

*Example II*

When exactly the same conditions as above in Example I were used, except that the CO content of the second stage feed gas was increased to 33.3 per cent, corresponding to the percentage in the initial feed gas to the first stage, a yield of 17 gms. per liter of catalyst per hour of hydrocarbons ($C_3+$) was obtained from the second stage. This yield is equivalent to that obtained in the first stage. The composition of the second stage feed gas was:

|  | Percent |
|---|---|
| CO | 33.3 |
| $H_2$ | 45.2 |
| $CH_4$ | 17.3 |
| $CO_2$ | 3.7 |
|  | 99.5 |

The foregoing results clearly demonstrate that when the CO concentration of the feed gas to the second stage is increased to the same concentration as that in the first stage, the yield is substantially increased, even though by so doing the hydrogen-CO ratio in the second stage reaction is decreased.

I claim:

1. A process for the synthesis of hydrocarbons which comprises contacting a gas mixture consisting essentially of carbon monoxide and hydrogen as the reactive materials with a cobalt-containing catalyst in a first conversion stage under conversion conditions of temperature, pressure and flow rate, said carbon monoxide and hydrogen being in the proportion of from 1 to 3 volumes of hydrogen per volume of carbon monoxide and effecting not more than 70 per cent conversion of carbon monoxide, separating $C_3+$ products of reaction from the effluent, recovering a residual gas containing unreacted carbon monoxide and hydrogen together with gases inert in the synthesis reaction wherein the volume per cent carbon monoxide and the hydrogen to carbon monoxide ratio are less than the carbon monoxide concentration and the hydrogen to carbon monoxide ratio in the feed gas to the first conversion stage, adding additional carbon monoxide to said residual gas to raise the volume per cent of carbon monoxide to that value which is present in the feed gas to the first conversion stage and without increasing the hydrogen concentration in said residual gas, and introducing the resulting gas mixture into a second stage conversion zone under the same conditions as the first stage conversion zone whereby additional hydrocarbons in yields equal to those obtained from the first stage are synthesized.

2. A process for the synthesis of hydrocarbons which comprises contacting a gas mixture consisting essentially of carbon monoxide and hydrogen as the reactive materials with a cobalt catalyst for the reaction in a first conversion stage under conversion conditions of temperature, pressure, and flow rate, said carbon monoxide and hydrogen being in the proportion of 2 volumes of hydrogen per volume of carbon monoxide and effecting not more than 70 per cent conversion of said carbon monoxide, separating $C_3+$ products of reaction from the effluent, recovering a residual gas containing unreacted carbon monoxide and hydrogen together with normally gaseous hydrocarbons inert in the synthesis reaction wherein the volume per cent carbon monoxide and the hydrogen to carbon monoxide ratio are less than that in the feed gas to the first conversion stage, adding additional carbon monoxide to said residual gas to raise the volume per cent of carbon monoxide to that value which is present in the feed gas to the first conversion stage and without increasing the hydrogen concentration in said residual gas, and introducing the resulting gas mixture into a second stage conversion zone under the same conditions as the first stage conversion zone whereby additional hydrocarbons in yields equal to those obtained from the first stage are synthesized.

3. A process according to claim 2 wherein the reaction temperature in each conversion stage is within the range of 175 to 225° C.

4. A process according to claim 2 wherein the reaction pressure in each conversion stage is within the range of 5 to 150 atmospheres.

ALFRED CLARK.

REFERENCES CITED

The following references are of record in the file of this patent:

UNITED STATES PATENTS

| Number | Name | Date |
|---|---|---|
| 2,149,515 | Fischer | Mar. 7, 1939 |
| 2,207,581 | Duftschmid | July 9, 1940 |
| 2,243,869 | Keith, Jr., et al. | June 3, 1941 |
| 2,244,710 | Kolbel | June 10, 1941 |
| 2,264,427 | Asbury | Dec. 2, 1941 |
| 2,351,248 | Wirth | June 13, 1944 |
| 2,411,760 | Sensel | Nov. 26, 1946 |
| 2,417,164 | Huber, Jr. | Mar. 11, 1947 |

OTHER REFERENCES

Underwood, "Ind. and Eng. Chem.," vol. 32, 1940, pp. 440–454.

Myddleton et al., "Journal of Society of Chemical Industry" (London), vol. 55, 1936, pp. 121T to 124T.